UNITED STATES PATENT OFFICE.

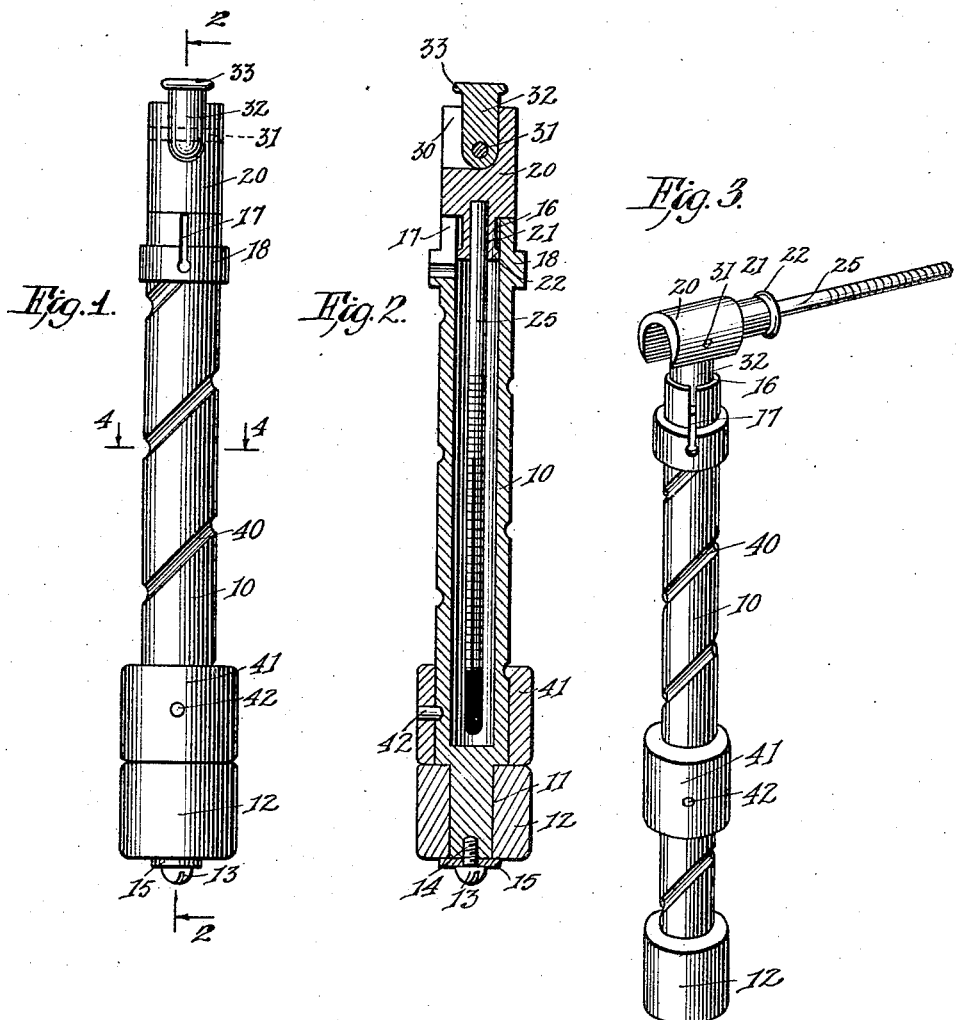

CHARLES ROBERT WALLENDORF, OF BROOKLYN, NEW YORK.

THERMOMETER CASE.

1,417,365.  Specification of Letters Patent.  Patented May 23, 1922.

Application filed May 8, 1920. Serial No. 379,871.

*To all whom it may concern:*

Be it known that I, CHARLES R. WALLENDORF, a citizen of the United States, and a resident of the city of New York, borough of Brooklyn, in the county of Kings and State of New York, have invented a new and Improved Thermometer Case, of which the following is a full, clear, and exact description.

The present invention relates to new and useful improvements in thermometer cases, and it pertains more particularly to cases for thermometers of the clinical type.

It is the primary object of the present invention to provide a case for thermometers by means of which the thermometer may be subjected to centrifugal action in order to facilitate the shaking down of the mercury before a reading is taken.

It is a further object of the invention to so construct a thermometer case that the thermometer when contained therein will be protected against accidental breakage.

It is a further object of the invention to provide a device of this character which will not be too bulky to permit of being carried on the person.

With the above and other objects in view, reference is had to the accompanying drawings, in which—

Figure 1 is a view in elevation of a thermometer case constructed in accordance with the present invention;

Fig. 2 is a longitudinal sectional view thereof taken on the line 2—2 of Fig. 1;

Fig. 3 is a perspective view of the device shown in the operative position of shaking down the mercury in the thermometer;

Fig. 4 is a transverse sectional view taken on the line 4—4 of Fig. 1;

Fig. 5 is a detail sectional view showing the method of mounting the thermometer in the position in which it is shown in Fig. 3.

Referring more particularly to the drawings, the device comprises a tubular member 10, one end of which is reduced as at 11. Mounted on the reduced end of the tubular member 10 is a handle 12, and said handle 12 is retained on the tubular member 10 by means of a bolt 14 engaging an internally screw-threaded socket on the end of the member 10. Interposed between the reduced end of the tubular member and the head 13 of the bolt 14, is a washer 15, by means of which the handle member 12 is prevented from displacement upon the reduced end 11 of the tubular member 10. The opposite end of the tubular member 10 is open as indicated at 16, and said open end is cut as at 17, to provide a resilient opening in the end of the tubular member 10. This open end of the tubular member 10 is provided with an annular shoulder 18 adjacent the open end 16, the purpose of which shoulder 18 will be hereinafter more specifically stated.

The reference character 20 designates a plug, and said plug is provided on one of its ends with a reduced portion 21 terminating in an annular bead 22. This annular bead 22 is of sufficient diameter to be frictionally retained within the open end of the tubular member 10, by reason of its engagement with the interior surface thereof. The plug 20 provides the means for supporting the thermometer 25, and said thermometer 25 is of the ordinary clinical type, and is secured within a socket in the plug 20, which socket enters the plug through the reduced portion 21 thereof. The opposite end of the plug 20 is cut away to form a recess 30, and pivotally mounted within said recess 30 by means of a pintle or the like 31, is a plug 32, the free extremity of which is provided with an annular bead 33.

As shown in Fig. 2, the plug 32 is in a position in longitudinal alinement with the tubular member 10, but the same is adapted to be swung to a position at right angles to the plug 20 and the tubular member 10 as shown in Fig. 3 in order that when in this position, the thermometer 25 will occupy a plane at right angles to the tubular member 10. The enlarged annular bead 33 of the plug 32 is adapted to be inserted within the open resilient end of the tubular member 10, as shown in Fig. 3, and when in this position it is capable of movement about the pivotal point to a position in which the thermometer occupies a plane at right angles to the tubular member 10. The tubular member 10 is provided on its exterior surface with a spiral groove 40, and slidably mounted upon the tubular member is a sleeve 41. This sleeve 41 is provided with a rigid pin 42 adapted to lie within the spiral groove 40 in such a manner that as the sleeve 41 is reciprocated longitudinally of the tubular member 10, the latter will be rotated by reason of the engagement of the rigid pin 42 with the spiral groove 40.

The device operates in the following manner: When it is desired to use the thermometer 25 for the purpose of taking a reading, the same is removed from the case or tubular member 10 in which position it is shown in Fig. 2 and the annular bead 33 of the plug 32 is forced within the resilient open end 16 of the tubular member 10, after which said plug is rocked about its pivotal point 31 to the position shown in Fig. 3. The handle member 12 is now grasped and the sleeve 41 is moved longitudinally of the tubular member 10. As the sleeve 41 is moved as stated the pin 42 by reason of its engagement with the spiral groove 40, sets up a rotation of the tubular member 10, under which action the mercury column of the thermometer will be shaken down, or in other words, the mercury will be removed from the column of the thermometer and forced into the mercury receptacle at the bottom of the column.

What is claimed is:

1. A thermometer case comprising a tubular member having a reduced end and an external spiral thread, a handle member revolubly mounted on the reduced end of said tubular member, a cap adapted for engagement with the open end of said tubular member, a thermometer carried by said cap, means pivotally mounted on said cap and adapted for engagement with the open end of said tubular member to support the thermometer at right angles thereto, and means adapted for engagement with said spiral thread to rotate said tubular member.

2. A thermometer case comprising a tubular member having a reduced end and an open end, said tubular member being provided with an external spiral thread, a handle revolubly mounted on the reduced end of said tubular member, a cap, a thermometer carried by said cap, and means movable longitudinally of said tubular member and having engagement with the spiral screw of the tubular member whereby said tubular member is rotated with respect to the handle member.

3. A thermometer case comprising an exteriorly spirally threaded tubular member having a reduced end, a handle carried by said reduced end and revolubly mounted thereon, means movable longitudinally of said tubular member and adapted for engagement with the spiral thread thereof to rotate the tubular member, and means for mounting a thermometer at right angles to said tubular member.

CHARLES ROBERT WALLENDORF.